United States Patent [19]

Nolte et al.

[11] Patent Number: 4,676,998

[45] Date of Patent: Jun. 30, 1987

[54] METHOD OF MAKING A FIRE-RESISTANT TRANSLUCENT SOLID LAYER

[75] Inventors: Hans-Henning Nolte; Wolfgang Zernial, both of Gelsenkirchen, Fed. Rep. of Germany

[73] Assignee: Flachglass Aktiengesellschaft, Fürth, Fed. Rep. of Germany

[21] Appl. No.: 811,247

[22] Filed: Dec. 19, 1985

[30] Foreign Application Priority Data

Dec. 19, 1984 [DE] Fed. Rep. of Germany ....... 3446202

[51] Int. Cl.⁴ .......................... B05B 5/00; B05D 3/02
[52] U.S. Cl. .................................... 427/161; 427/377; 427/397.8
[58] Field of Search ..................... 427/397.8, 377, 378, 427/161

[56] References Cited

U.S. PATENT DOCUMENTS 4,179,535 12/1979 Kalbskopf et al. .......... 427/397.8 X

FOREIGN PATENT DOCUMENTS 0100001 7/1983 European Pat. Off. .

*Primary Examiner*—Michael R. Lusignan
*Attorney, Agent, or Firm*—Karl F. Ross; Herbert Dubno

[57] ABSTRACT

The drying of a hydrated alkali metal silicate aqueous solution on a substrate to produce a light-transmissive fire-resistant layer is carried out at a temperature of about 100° C. in a drying chamber which is initially filled with water vapor. An operation of the water vapor is condensed and the atmosphere is replenished with helium, oxygen, nitrogen or a mixture thereof so that during the drying, the atmosphere consists at least 90% by volume of water vapor and one or more of these gases, the balance being nitrogen and/or argon and/or sulfur hexafluoride.

4 Claims, 2 Drawing Figures

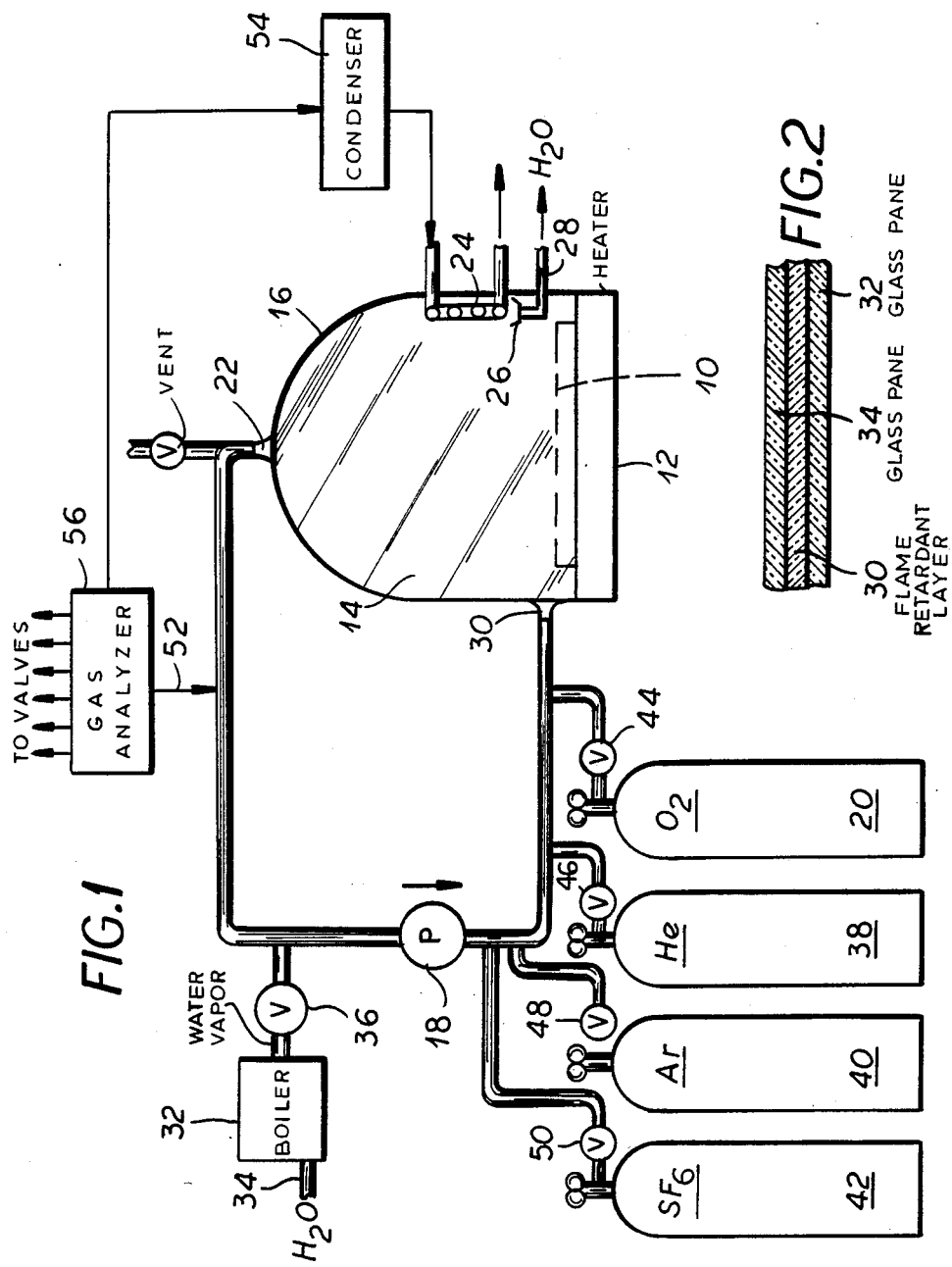

METHOD OF MAKING A FIRE-RESISTANT TRANSLUCENT SOLID LAYER

CROSS REFERENCE TO RELATED APPLICATIONS

This application is related to the commonly assigned copending application Ser. No. 742,367 filed June 7, 1985 (now U.S. Pat. No. 4,626,301 issued Dec. 2, 1986) by Hans-Henning NOLTE, one of the present joint inventors, and which in turn was a continuation of Ser. No. 515,923 filed July 20, 1983 (now abandoned) and based upon a German application P No. 32 27 057.7 of July 20, 1982, this latter application having given rise to a Europatent publication A No. 0100 001 which was published Feb. 8, 1984.

FIELD OF THE INVENTION

Our present invention relates to a method of producing a fire-resistant translucent solid layer and, specifically, by the drying of a hydrated alkali metal silicate which is applied in a water solution as a layer to a substrate, the fire-resistant layer being generated by this drying operation.

BACKGROUND OF THE INVENTION

As has been described in the aforementioned copending application and the corresponding Europatent publication, it is possible to produce upon a substrate, e.g. a glass pane, plate or foil, a solid layer which is translucent and may even be transparent, by the drying of an expandable material namely a hydrated alkali metal silicate by drying a water solution thereof on a substrate.

The solution can also include auxiliary materials and in general the drying is carried out by heating the layer in a drying chamber with a drying atmosphere critically chosen to minimize bubble and microbubble formation which might affect the light transmissivity characteristics.

Circulating water vapor and helium can form this atmosphere and the drying atmosphere is held at about 100° C.

The fire-resistant layer retains its effect when the layer is separated from the substrate or is integrated into a plate or structure, e.g. a light-permeable part of a plate structure, by being sandwiched between two glass panes, and whether the layer is in the form of a plate or a foil.

In general the compositions of the layers described in the aforementioned copending application and the uses thereof will be applicable here as well, and, as a consequence, the aforementioned copending application is hereby incorporated in its entirety by reference.

The substrate can, as noted, be a glass pane or a foil which remains bonded to the layer or from which the layer is removed. The layer is therefore either left on the substrate or otherwise incorporated in a fire-resistant wall or a portion of a fire-resistant wall of a structure. The auxiliary materials which can be included in the solution and may find their way into the layer are those named in the aforementioned copending application such as urea, di- or polyhydric alcohols, saccharides, sodium phosphate, sodium aluminate, aluminum phosphate, borax and boric acid.

As noted previously, the aforementioned copending application describes the fact that the choice of the drying atmosphere is critical to the properties of the product which is to result. In that case, as in the Europatent publication, the drying atmosphere must contain at least 30 volume percent oxygen and a maximum of 15% by volume in total of one or more of the gases argon, nitrogen and sulfur hexafluoride, the balance being water vapor and/or helium.

Bubbles and microbubbles can thus be avoided in the layer which is produced so that the layer has excellent light transmissivity properties and the aging characteristics of the layer are good under most conditions and at least until the layer is altered by exposure to fire to the point that its fire-protective function is lost.

However, the aging resistance, especially under the effect of light and solar radiation, can be improved further.

OBJECTS OF THE INVENTION

It is the principal object of the present invention to provide a method of making a fire-resistant layer which improves upon the earlier methods described, especially so as to improve the aging properties of the layer with respect to visible light and solar radiation.

SUMMARY OF THE INVENTION

We have not found that it is possible to improve the aging properties of such a layer without materially adversely affecting the light transmissive properties thereof if, in the drying process, the drying chamber after the substrate coated with the solution has been introduced (when the drying is carried out at about 100° C.), is filled with water vapor, a portion of the water vapor is condensed from the drying chamber atmosphere and replaced by at least one gas selected from the group which consists of helium, oxygen, hydrogen and mixtures thereof so that one or more of these gases refill the drying chamber, and controlling the drying atmosphere thereafter such that the content of water vapor plus one or more of these gases is at least 90 volume percent, the balance being nitrogen and/or argon and/or sulfur hexafluoride.

Naturally, when the gas component selected from the group which consists of helium, oxygen, hydrogen and mixtures thereof consists of or contains oxygen together with hydrogen, the proportions of the two should be selected so that they are below an explosive limit or an ignition limit.

Of course during drying water vapor is continuously generated by evaporation of water from the solution layer into the atmosphere, i.e. is liberated from the drying fire-resistant layer. However, this water vapor poses no problem as long as the composition remains within the indicated bounds, and, of course, water vapor is removed, e.g. by continued condensation, so that the drying continues.

The addition of argon and/or sulfur hexafluoride is advantageous because these serve as stabilizers.

Naturally when the total of water vapor, helium and oxygen is at less that 90 volume percent, the content of nitrogen, argon, sulfur hexafluoride and mixtures thereof is correspondingly limited.

Preferably the nitrogen content in the drying atmosphere is a maximum of 8 volume percent.

While the presence of oxygen is not essential for the present invention, it has been found to be advantageous when oxygen is used to provide an oxygen content of at least 20 volume percent in the drying atmosphere.

BRIEF DESCRIPTION OF THE DRAWING

The above and other objects, features and advantages of the present invention will become more readily apparent from the following description, reference being made to the accompanying drawing in which:

FIG. 1 is a diagram of an apparatus for carrying out the process of the present invention; and FIG. 2 is a cross sectional view through a product which can embody the fire-resistant layer of this invention.

SPECIFIC DESCRIPTION

In FIG. 1 of the drawing, we have shown a drying chamber 14 disposed above a heater 12 upon which a substrate 10 carrying the layer of aqueous solution of the alkali metal silicate is positioned, this drying chamber being formed as a hood 16 with an outlet 22 and containing a coil 24 through which water or another coolant can be circulated to condense water vapor out of the atmosphere within the chamber 14. The condensed water vapor is collected in a trough 20 and carried off by the line 28. A pump 18 is connected to the fitting 22 and to an inlet fitting 30 of the hood so that circulation of the atmosphere is possible.

As previously mentioned, the drying chamber 14 is initially filled exclusively with water vapor which can be generated by a boiler 32 supplied with feed water at 34, the water vapor being delivered at a controlled rate via the valve 36.

The oxygen tank 20, a helium tank 38, an argon tank 40 and a sulfur hexafluoride tank 42 are connected via respective valves 44, 46, 48 and 50 to the inlet 30 to allow control of the composition of the atmosphere and a sensor represented at 52 can be provided to detect the composition of the circulating atmosphere and operate the condenser controller 54, the gas analyzer 56 having outputs to the respective valves to maintain the desired gas atmosphere.

The operation of the device follows the method previously described and exemplified in the following specific example:

A rectangular glass pane 10 of an upper surface area of about 0.33 m² is coated with 3.7 liters of an aqueous water glass solution, is warmed to a temperature of about 70° C. and is placed on the heating plate 12 where it is raised to a temperature of 100° C. The drying chamber 14, previously flushed with a circulation mixture of 90 volume percent water vapor and 10% helium is, upon introduction of the plate into the chamber, brought to an atmosphere of 100% water vapor by cutting off the supply from the helium tank, and venting the chamber until the water vapor content of the atmosphere is 100%. Once the water varpor content of the chamber is at 100% by volume, over a period of about 3 hours gradually, water vapor is condensed from the atmosphere via the coil 24, the condensed water being collected by the trough 26, the water vapor being replaced by a mixture of 10 volume percent helium, 70 volume percent oxygen, 10 volume percent argon and 6 volume percent sulfur hexafluoride, about 4 volume percent nitrogen also being present in this mixture, until the water vapor content is reduced to about 50% by volume.

With the atmosphere in the drying chamber now consisting of about 50 volume percent water vapor, 5 volume percent helium, 35 volume percent oxygen, 2 volume percent nitrogen, 5 volume percent argon and 3 volume percent sulfur hexafluoride, drying is continued for an additional 15 hours. Condensation of water vapor as the water vapor content in the atmosphere increases by evaporation of water from the layer is carried out continuously. The dried layer has the advantageous optical properties of the layer of the aforementioned copending application, but has an improved resistant to aging when subjected to solar radiation.

The fire-retardant layer 30 can be provided between two glass panes 32 and 34 as shown in FIG. 2 and as described in the aforementioned copending application to produce a light transmissive glass panel for use in fire-resistant structures.

We claim:

1. A method of producing a translucent solid fire-resistant layer of an expandable material which comprises the steps of:
    coating a substrate with an aqueous solution of a hydrated alkali metal silicate;
    disposing the substrate coated with said solution in a drying chamber and heating same to a temperature of substantially 100° C.;
    initially filling said chamber with water vapor;
    thereafter condensing a portion of the water vapor from the atmosphere in said chamber and replenishing said atmosphere with a gas component selected from the group which consists of helium, oxygen, nitrogen and mixtures thereof; and
    controlling said atmosphere during drying of said solution on said substrate to form a light-transmissive fire-resistant layer so that water vapor and said component make up at least 90 volume percent of said atmosphere and the balance consists of nitrogen, argon, or sulfur hexafluoride or a mixture thereof.

2. The method defined in claim 1 wherein the nitrogen content of said atmosphere is maintained during the drying at a maximum of 8 volume percent.

3. The method defined in claim 1 wherein said component includes oxygen and the oxygen content of said atmosphere is maintained at least 20 volume percent during drying.

4. The method defined in claim 1 wherein said atmosphere is circulated continuously through said chamber during drying of said solution on said substrate.

* * * * *